United States Patent [19]

Nagira et al.

[11] 4,388,169
[45] Jun. 14, 1983

[54] APPARATUS FOR SURFACE TREATMENT OF A STEEL STRIP

[75] Inventors: Norichika Nagira; Hiroshi Ikegami; Hiroji Baba, all of Kitakyushu; Kanji Yahano, Himeji, all of Japan

[73] Assignee: Nippon Steel Corporation, Tokyo, Japan

[21] Appl. No.: 260,725

[22] Filed: May 5, 1981

[30] Foreign Application Priority Data

Oct. 9, 1980 [JP] Japan ................... 55-141307

[51] Int. Cl.³ .................................. C25D 17/00
[52] U.S. Cl. .......................... 204/207; 204/210
[58] Field of Search ............... 204/207, 210

[56] References Cited

U.S. PATENT DOCUMENTS

| | | | |
|---|---|---|---|
| 1,991,817 | 2/1935 | Nachtman | 204/210 |
| 2,372,599 | 3/1945 | Nachtman | 204/206 |
| 2,503,217 | 4/1950 | Prust | 204/207 |
| 2,933,438 | 4/1960 | Lancy | 204/207 |
| 3,081,238 | 3/1963 | Gurry | 204/207 |
| 3,346,466 | 10/1967 | Golden | 204/207 |

*Primary Examiner*—T. M. Tufariello
*Attorney, Agent, or Firm*—Wenderoth, Lind & Ponack

[57] ABSTRACT

A surface treatment apparatus for producing a steel strip having an enhanced phosphatizing property, has a plurality of guide rolls for guiding the strip along a predetermined path, a pickling vessel having nozzles for spraying a pickling liquid onto the surface of the strip, a first rinsing vessel having nozzles for spraying water onto the strip surface, an electrolytic treating vessel having an anode and a temperature control for the electrolytic treating liquid, a second rinsing vessel having nozzles for spraying water onto the strip surface, and a voltage supply for applying a voltage between an anode and a cathode consisting of a guide roll located beside and close to the electrolytic treating liquid contained in the electrolytic treating vessel.

4 Claims, 3 Drawing Figures

APPARATUS FOR SURFACE TREATMENT OF A STEEL STRIP

FIELD OF THE INVENTION

The present invention relates to an apparatus for the surface treatment of a steel strip. More particularly, the present invention relates to an apparatus for the surface treatment of a steel strip which apparatus is useful for enhancing the capability of forming a phosphate film firmly bonded to the surface of the steel strip and the capability of firmly bonding a paint coating having an excellent corrosion-resistance onto the surface of the steel strip, and which apparatus can advantageously be connected to an outlet of an annealing apparatus.

BACKGROUND OF THE INVENTION

It is known that when a steel strip is used for producing a shaped article, for example, the body of an automobile, the steel strip is pressed into a desired shape, and the shaped steel strip is subjected to a phosphate treatment in which a phosphate film is formed on the surface of the shaped steel strip and then the phosphate-treated steel strip is coated with paint. In this case, the steel strip needs to exhibit a capability of forming a phosphate film firmly bonded onto the surface thereof and a capability of firmly bonding the paint coating having an excellent corrosion-resistance on the surface of the phosphate coating.

The capability of forming a phosphate film on a surface of a steel strip when the steel strip is subjected to a phosphate treatment is referred to hereinafter as the phosphatizing property of the steel strip.

The capability of firmly fixing a paint coating resistant to corrosion to the surface of a steel strip when the steel strip is coated with paint is referred to hereinafter as the corrosion-resistant paint coating-bonding property of the steel strip. It is also known that it is possible to produce a steel strip having a satisfactory phosphatizing property and a satisfactory corrosion-resistant paint coating-bonding property by a conventional finishing process comprising the steps of surface-cleaning, for example, by an electrolytic degreasing procedure; heating the surface-cleaned steel strip which has been wound to form a coil to a recrystallizing temperature thereof or higher in a reducing atmosphere in a batch type box-shaped annealing furnace; uniformly heating the steel strip at the above-mentioned temperature in the reducing atmosphere for a predetermined time; first cooling, in the reducing atmosphere, the uniformly heated steel strip to a temperature at which the surface of the steel strip is not oxidized; removing the thus cooled steel strip from the annealing furnace; further cooling the removed steel strip to a temperature at which no aging occurs in the steel strip and, finally, temper rolling the further cooled steel strip.

The above-described conventional finishing process includes a number of steps and, therefore, is complicated and sometimes too troublesome when it is necessary to connect the steps to each other. Also, the initial heating, uniform heating and first cooling procedures are successively applied to the coiled steel strip in the box-shaped annealing furnace. These procedures cause the finishing process to be prolonged. Therefore the productivity and economic efficiency of the conventional finishing process are unsatisfactory.

In order to improve the productivity and economic efficiency of the finishing process, various attempts have been made to simplify and/or continuously carry out the finishing process.

In order to heat the steel strip to the desired annealing temperature with a high thermal efficiency within a short period of time, an attempt has been made to directly heat the steel strip in a continuous annealing furnace. This direct heating method is effective for utilizing the heat generated in the continuous annealing furnace with a high efficiency and for increasing the heating rate for the steel strip so as to shorten the heating time for the steel strip.

In order to rapidly cool the annealed steel strip to a desired temperature within a short period of time, an attempt has been made to utilize jets of water or a mixture of water and a gas, for example, AX gas which is a mixture of nitrogen and hydrogen. This jet cooling method is effective for allowing the cooling rate of the steel strip to be easily changed over a wide range in response to the desired quality of the steel strip and for permitting the cooling procedure per se to be readily stopped when the steel strip reaches a desired temperature.

However, it has been found that when the steel strip is subjected to a direct heating type annealing procedure, the surface of the steel strip is oxidized while the temperature of the steel strip is being elevated even if the air ratio is strictly controlled. The oxidized surface is reduced in the next stage of holding the steel strip at the elevated annealing temperature in a reducing atmosphere. In this reduction, since the surface of the steel strip comes into direct contact with the reducing atmosphere, the surface is excessively activated. The activated surface of the steel strip exhibits a poor phosphatizing property.

That is, when the surface of the steel strip is subjected to bonderizing procedures, the crystals in the resultant phosphate film are coarse.

Also, when the steel strip is cooled from the annealing temperature to an overaging temperature or lower by jetting water or a mixture of water and a gas, for example, the AX gas, the surface of the steel strip is oxidized, sometimes to the extent that the average thickness of the resultant oxide layer reaches 500 angstroms or more, for example, 2000 angstroms. The overaging procedure is carried out at a relatively low temperature of 200° to 500° C. in a reducing atmosphere. Therefore, it is impossible to satisfactorily reduce the oxide layer on the steel strip in the overaging procedure. Accordingly, on the overaged steel strip the remaining oxide layer has an unsatisfactory appearance and exhibits a poor corrosion-resistant paint coating-bonding property.

Proposals have been made to eliminate the disadvantages of the above-described annealing-cooling method. Japanese Patent Application Laid-open No. 53-132418 discloses a process for removing the oxide layer from the overaged steel strip by introducing the overaged steel strip into a pickling apparatus located downstream of the overaging furnace.

However, it has been found by the inventors of the present invention that the removal of the oxide layer by the pickling procedure causes the surface structure of the resultant pickled steel strip to be excessively uniform. This excessively uniform surface structure causes the surface of the steel strip to exhibit a poor bonderizing activity. Therefore, when the pickled steel strip is subjected to a phosphatizing procedure, the nucleuses of the bonderizing crystals are formed only in a restricted area and the bonderizing crystals are coarse. This phenomenon results in a poor corrosion-resistant coating-bonding property of the steel strip.

It has been found that the above-described disadvantages resulting from the pickling procedure applied to the steel strip after the overaging procedure can be eliminated by descaling the surface of the steel strip and by forming a defective metal deposit layer incompletely covering the descaled surface and consisting of at least one member selected from the group consisting of nickel, manganese, cobalt, copper and molybdenum.

It is strongly desirable that the descaling procedure and the procedure for forming the defective metal deposit layer be integrated with the annealing procedure so as to make it possible to carry out the overall process in a single process line and continuously at a high efficiency.

SUMMARY OF THE INVENTION

An object of the present invention is to provide an apparatus for the surface treatment of a steel strip, which apparatus is effective for enhancing the phosphatizing property and the corrosion-resistant coating-bonding property of the steel strip.

Another object of the present invention is to provide an apparatus for the surface treatment of a steel strip, which is capable of being connected to a continuous annealing apparatus to provide a single process line for the steel strip.

The above-described objects can be attained by the apparatus of the present invention for the surface treatment of a steel strip, which comprises:

(1) a plurality of guide rolls for moving a steel strip along a predetermined path;

(2) a pickling vessel through with a portion of the steel strip path extends, and which is provided with means for spraying a pickling liquid toward at least one surface of the steel strip located therein;

(3) a first rinsing vessel through which a portion of the steel strip path extends and which is located downstream of the pickling vessel and provided with means for spraying rinsing water toward at least the pickled surface of the steel strip;

(4) an electrolytic treating vessel for containing an electrolytic treating liquid, through which vessel a portion of the steel strip path extends and which vessel is located downstream of the first rinsing vessel and provided with at least one anode located below the level of the electrolytic treating liquid therein and facing at least the rinsed surface of the steel strip, and means for controlling the temperature of the electrolytic treating liquid;

(5) a second rinsing vessel through which a portion of the steel strip path extends and which is located downstream of the electrolytic treating vessel and provided with means for spraying rinsing water toward at least the electrolytically treated surface of the steel strip, and;

(6) means for applying a voltage between the anode and a cathode consisting of at least one of the guide rolls located beside and close to the electrolytic treating liquid contained in the electrolytic treating vessel.

The surface treatment apparatus of the present invention can be advantageously connected to the outlet of an annealing apparatus for a steel strip.

DETAILED DESCRIPTION OF THE INVENTION

Figure 1:
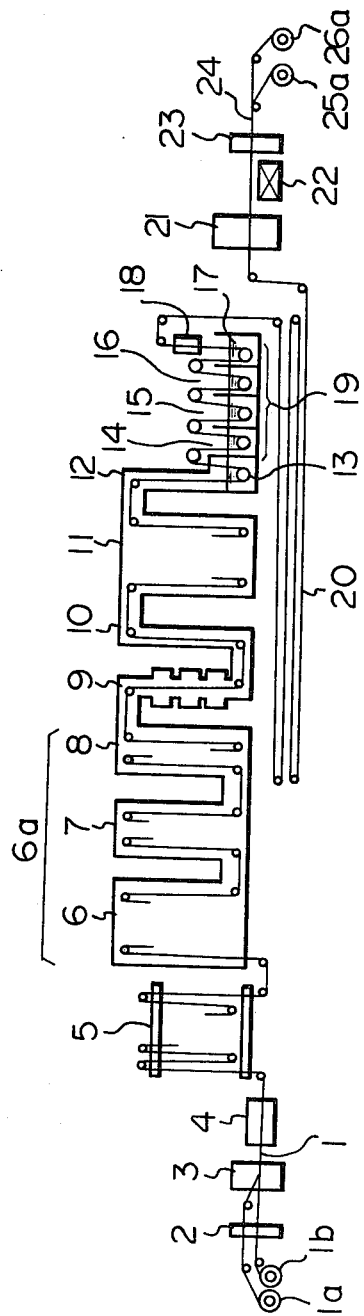
FIG. 1 is a diagrammatic view of a process line comprising a continuous annealing apparatus and a surface treatment apparatus for a steel strip according to the invention.

The surface treatment apparatus of the present invention is preferably connected to the outlet of an annealing apparatus for a steel strip, so as to form a complete process line, for example, as shown in FIG. 1.

Referring to FIG. 1, a steel strip 1 is uncoiled from a coil 1a or 1b, and any defective front end portion of the steel strip 1 is removed by an entry shearing machine 2. The thus sheared front end of the steel strip is welded to the trailing end of the preceding strip by using a 3. The welded steel strip is cleaned in an electrolytic cleaning zone 4, and introduced into inlet looper 5, and then, into an annealing furnace sections 6a which include a temperature-elevating chamber 6, a temperature-holding chamber 7 and a first gradual cooling chamber 8. In the temperature-elevating chamber 6, the steel strip 1 is heated to a predetermined annealing temperature by directly heating the steel strip with a burner flame or by emitting radiant heat from a radiant heat tube onto the steel strip. The steel strip 1 is held at the predetermined annealing temperature in the temperature-holding chamber 7. In this chamber 7, the heating operation is carried out by using a radiant heat tube or electric heater (not shown in FIG. 1). Next, the steel strip 1 is introduced into the first gradual cooling chamber 8 in which the steel strip 1 is gradually and uniformly cooled to a predetermined temperature. In this first gradual cooling chamber 8, the cooling operation may be carried out by using a gas jet cooler (not shown in FIG. 1). The cooling of the steel strip may be naturally carried out without using any cooling means. Also, the first gradual cooling chamber 8 may be omitted from the annealing furnace section 6a.

The exit of the annealing furnace section is connected to the entrance of a rapid cooling chamber 9 in which the steel strip is cooled to a predetermined temperature by using a plurality of cooling gas-liquid mixture streams, while controlling the cooling rate of the steel strip and the final (end point) temperature of the cooled steel strip.

Next, the cooled steel strip 1 is introduced into a drying chamber 10 so as to completely dry the steel strip. The combination of the cooling chamber 9 and the drying chamber 10 may be referred to as a cooling zone. The dried steel strip 1 is introduced into an overaging chamber 11 and then into a second gradual cooling chamber 12 having, for example, a gas jet cooler (not shown in FIG. 1). The cooled steel strip 1 is cooled with water in a water-cooling vessel 13. The combination of the second gradual cooling chamber 12 and the water-cooling vessel 13 may be referred to as a final cooling zone which is used for cooling the steel strip 1 to a certain temperature suitable for surface-treating the steel strip 1.

The cooled steel strip 1 is surface treated in the surface-treatment apparatus 19 of the present invention which includes a pickling vessel 14, first rinsing vessel 15, an electrolytic treating vessel 16 and a second rinsing vessel 17.

The surface-treated steel strip 1 is dried in a dryer 18. Thereafter, the dried steel strip 1 is passed through a delivery looper 20, and then temper rolled by a temper rolling mill 21. The temper rolled steel strip 1 is inspected on an inspecting table 22, and, if necessary, defective portions of the steel strip are removed by a shearing machine 23. The resultant steel strip 24 is coiled into a coil 25a or 25b.

Figure 2:
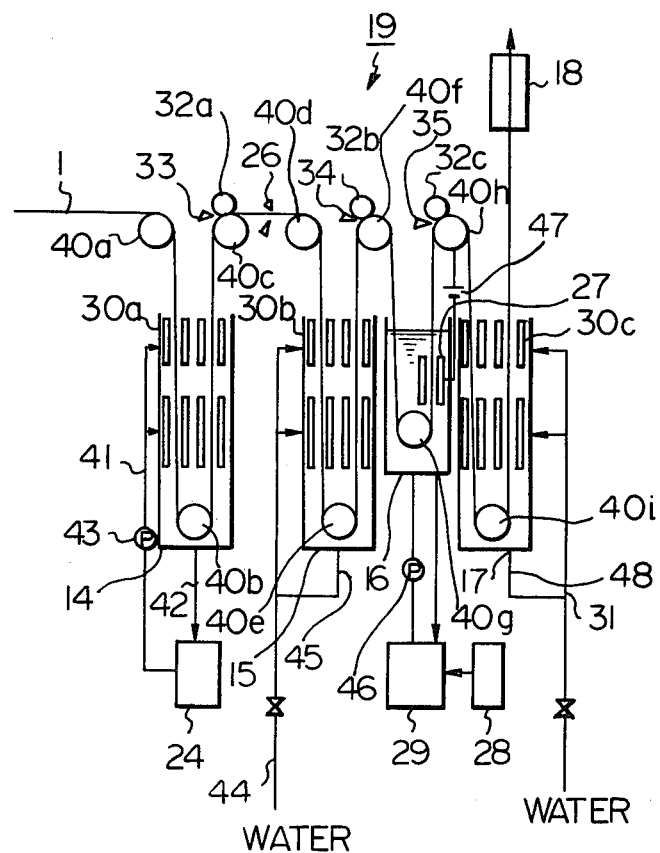
FIG. 2 is a diagrammatic view of an embodiment of the surface treatment apparatus of the present invention.

The surface treatment apparatus of the present invention will is illustrated in detail in FIG. 2.

In FIG. 2 there are shown the details of the surface treatment apparatus 19, namely the pickling vessel 14, the first rinsing vessel 15, the electrolytic treating vessel 16 and the second rinsing vessel 17. The steel strip 1 moves along a predetermined path defined by a plurality of guide rolls 40a through 40i. In FIG. 2, the moving path of the steel strip 1 is in an up and down zigzag form.

The pickling vessel 14 through which a portion of the steel strip zigzag path defined by the guide rolls 40a, 40b and 40c extends, is provided with means for spraying a pickling liquid toward both or either one of the surfaces of the steel strip. That is, one or more spray headers 30a each having one or more spraying nozzles (not shown in FIG. 2) are arranged in the pickling vessel 14 in such a manner that each spraying nozzle is directed toward the path of the steel strip. The spray headers 30a are capable of spraying the pickling liquid under pressure onto the surfaces of the steel strip through the spraying nozzles. The pickling liquid is supplied from a pickling liquid tank 24 through a pipe line 41 and a pump 43 to the spray headers 30a under pressure. The sprayed pickling liquid flows down along the surface of the steel strip and falls down to the bottom of the pickling vessel 14. The pickling liquid is then introduced from the bottom of the pickling vessel 14 into the pickling liquid tank 24 through a pipe line 42. That is, the pickling liquid tank 24, the pipe line 41, the pump 43, the spray headers 30a, the pickling vessel 14 and the pipe line 42 form a circulating liquid. The spraying nozzles in the spray header may be in the form of a slit or a plurality of orifices or holes through which the pickling liquid is ejected under pressure. The pickling liquid to be used in the pickling vessel is not limited to a specific type of aqueous acid solution. The pickling liquid may be an aqueous solution of sulfuric acid or hydrochloric acid. Usually, the preferred pickling liquid consists of a dilute aqueous solution of hydrochloric acid which has a high pickling efficiency.

The first rinsing vessel 15 is arranged downstream from the pickling vessel 14 and the pickled steel strip 1 is introduced into the first rinsing vessel 15 by the guide rolls 40c and 40d.

In the introduction of the pickled steel strip 1 into the first rinsing vessel 15, it is preferable that the pickled surface of the steel strip be maintained in a wet condition. If the pickled surface is dried before being rinsed with water in the first rinsing vessel 15, the color of the pickled surface is undesirably changed to yellow. This phenomenon causes the quality of the steel strip to be degraded.

In order to maintain the pickled surface of the steel strip in a wet condition, it is preferable that supplementary means for spraying the pickling liquid toward at the pickled surface or surfaces of the steel strip be positioned over the outlet of the pickling vessel 14. That is, a supplementary spraying nozzle 33 for the pickling liquid is positioned between the outlet of the pickling vessel 14 and the guide roll 40c. The supplementary nozzle 33 may be connected to the tank 24 through a pipe line (not shown in FIG. 2). In this case, it is also preferable that means for removing an excessive amount of the pickling liquid retained on the steel strip surface be arranged just downstream from the supplementary pickling liquid-spraying means 33. In the present embodiment, a wringer roll 32a is above and opposed to the guide roll 40c.

Additionally, it is preferable that additional means for spraying water toward the pickled surface or surfaces of the steel strip be located between the pickling vessel 14 and the first rinsing vessel 15. In FIG. 2, this means takes the form of at least one spray nozzle 26 positioned between the guide rolls 40c and 40d. The spray nozzle 26 is connected to a water supply source (not shown in FIG. 2) and is capable of spraying water toward the surface of the steel strip 1 under pressure.

The first rinsing vessel 15 contains a portion of the steel strip path defined by the guide rolls 40d, 40e and 40f, and is provided with means for spraying rinsing water toward one or both pickled surfaces of the steel strip. The first rinsing water-spraying means comprises at least one spray header 30b each having one or more spraying nozzles (not shown in FIG. 2) which are arranged in the first rinsing vessel 15 in such a manner that each spraying nozzle is directed toward the moving path of the steel strip. The spray headers 30b are capable of spraying the rinsing water onto the pickled surfaces of the steel strip under pressure.

The rinsing water is supplied from a water supply source (not shown in FIG. 2) through a pipe line 44. The sprayed rinsing water flows down along the surface of the steel strip and then falls down into the bottom of the first rinsing vessel 15. The rinsing water may be discharged to the outside of the apparatus or may be withdrawn from the bottom of the vessel 15 and introduced into the water supply pipe line 44 through a pipe line 45. That is, the rinsing water can circulate through the pipe line 44, spray headers 30b, the vessel 15 and the pipe line 45.

The electrolytic treating vessel 16 is located downstream from the first rinsing vessel 15, and the rinsed steel strip 1 is introduced into the electrolytic treating vessel 16 over the guide roll 40f.

In order to prevent yellowing of the rinsed surface of the steel strip 1, it is preferable that the surface be maintained in a wet condition until an electrolytic treating liquid comes into contact with the steel strip surface. For this purpose, it is preferable that supplementary means for spraying water toward at least one rinsed surface of the steel strip be positioned over the outlet of the first rinsing vessel 15. In the present embodiment, this means is a supplementary water spraying nozzle 34 disposed between the first rinsing vessel 15 and the guide roll 40f. In this case, it is also preferable that means for removing an excessive amount of water retained on the surface of the steel strip 1 be arranged just downstream from the supplementary water spraying means 34. In the present embodiment, this means is a wringer roll 32b arranged over and opposed to the guide roll 40f.

The electrolytic treating vessel 16 contains a portion of the steel strip path defined by the guide rolls 40f, 40g and 40h, and is provided with an anode or anodes 27 located below the level of the electrolytic treating liquid therein and facing the rinsed surface or surfaces of the steel strip. Also, the electrolytic treating vessel 16 is provided with means (not shown in FIG. 2) for controlling the temperature of the electrolytic treating liquid.

A portion of the electrolytic treating liquid is withdrawn from the electrolytic treating vessel 16 and introduced into an electrolytic treating liquid tank 29. In this tank 29, the composition and the temperature of the electrolytic treating liquid are adjusted to desired values, respectively. That is, the temperature controlling means may be connected to the tank 29. Also, a concentrated electrolytic liquid may be prepared in a supplementary tank 28 and a desired amount of the concentrated electrolytic liquid may be fed into the tank 29.

The adjusted electrolytic treating liquid is fed from the tank 29 into the electrolytic treating vessel 16 by a pump 46.

In the electrolytic treating vessel 16, a desired electrolytic treatment is applied to the pickled and rinsed steel strip surface having an enhanced surface activity, by applying a voltage between the anode and the steel strip immersed in the electrolytic treating liquid. For this purpose, the surface treatment apparatus is provided with means 47 for applying a voltage between the anode or anodes 27 and a cathode consisting of at least one of the guide rolls 40f and 40h located beside and close to the electrolytic treating liquid contained in the electrolytic treating vessel 16. That is, the guide roll 40f or 40h serves as a conductor roll for the steel strip 1.

The electrolytic treatment to be applied to the steel strip surface may be a cathodic electrolytic deposition of at least one metal selected from the group consisting of manganese, nickel, cobalt, copper and molybdenum. The resultant deposited metal layer is preferably defective and incompletely covers the steel strip surface. This defective metal deposit layer is effective for enhancing the phosphatizing property and the corrosion resistant coating-bonding property of the surface of the steel strip. That is, the defectively deposited metal serves as nucleuses for crystals to be created in the phosphate layer on the steel strip surface by the bonderizing method.

The second rinsing vessel 17 is arranged downstream from the electrolytic treating vessel 16. The electrolytically treated steel strip is withdrawn from the electrolytic treating vessel 16 and introduced into the second rinsing vessel 17.

In order to keep the withdrawn steel strip surface wet until it is introduced into the second rinsing vessel 17, it is preferable that means 35 for spraying electrolytic treating liquid toward the treated surface of the steel strip, be disposed over the outlet of the electrolytic treating vessel 16. In this embodiment, this means is a nozzle 35 for spraying the electrolytic treating liquid and which is located between the electrolytic treating vessel 16 and the guide roll 40h. The nozzle 35 may be connected to the tank 29 through a pipe line (not shown in FIG. 2). Also, it is preferable that means 32c be provided for removing an excessive amount of the electrolytic treating liquid retained on the treated surface of the steel strip. In this embodiment, this means is a wringer roll 32c is disposed over and opposed to the guide roll 40h.

The second rinsing vessel 17 contains a portion of the steel strip path defined by the guide rolls 40h and 40i and a dryer 18. The second rinsing vessel 17 is provided with means for spraying rinsing water toward one or both electrolytically treated surfaces of the steel strip. This second rinsing water-spraying means comprises at least one spray header 30c each having one or more spraying nozzles (not shown in FIG. 2) which are arranged in the second rinsing vessel 17 in such a manner that each spraying nozzle is directed toward the moving path of the steel strip. The spray nozzles 30c are capable of spraying the rinsing water onto the electrolytically treated surfaces of the steel strip under pressure.

The rinsing water is supplied from a water supply source (not shown in FIG. 2) through a pipe line 31. The sprayed water flows down along the surface of the steel strip and then falls down into the bottom of the second rinsing vessel 17. The rinsing water may be discharged to the outside of the apparatus or may be withdrawn from the bottom of the vessel 17 and introduced into the water supply pipe line 31 through a pipe line 48. In the latter case, the rinsing water can circulate through the pipe line 31, spray headers 30c, the vessel 17 and the pipe line 48. Also, the pipe line 48 of the second rinsing vessel 17 may be connected to the pipe line 44 of the first rinsing vessel 15. This connection allows the rinsing water used in the second rinsing vessel 17 to be utilized again in the first rinsing vessel 15.

The dryer 18 is located over the outlet of the second rinsing vessel 17. The second rinsed steel strip 1 is introduced into the dryer 18 and dried therein.

In an experiment involving the surface treatment of a steel strip by using the apparatus of the present invention, a cold rolled steel strip consisting of a capped steel containing 0.06% carbon, 0.01% silicon and 0.25% manganese was annealed by using a continuous annealing apparatus as shown in FIG. 1, in which apparatus the steel strip was held at a temperature of 700° C. for 40 seconds in an HNX atmosphere.

The annealed steel strip at a temperature of 90° C. was introduced into the surface treatment apparatus as shown in FIG. 2. In the pickling vessel, the steel strip was pickled with an aqueous solution of 2% hydrochloric acid at a temperature of 90° C. By this pickling procedure, an oxide layer having a thickness of 200 angstroms which was present on each surface of the steel strip was completely removed.

The pickled steel strip was introduced into a first rinsing vessel and rinsed with water at a temperature of about 40° C.

Next, the rinsed steel strip was introduced into an electrolytic treating vessel containing an aqueous solution of 30 g/l nickel sulfate, 45 g/l nickel chloride and 30 g/l boric acid, at a temperature of 50° C. A current of 1 amperes/dm$^2$ was applied to the electrolysis system. 6 mg/m$^2$ of nickel was deposited on each surface of the steel strip.

The electrolytically treated steel strip was introduced into a second rinsing vessel and rinsed with water at a temperature of about 30° C. The rinsed steel strip was dried in a dryer at a temperature of 90° C.

Figure 3:
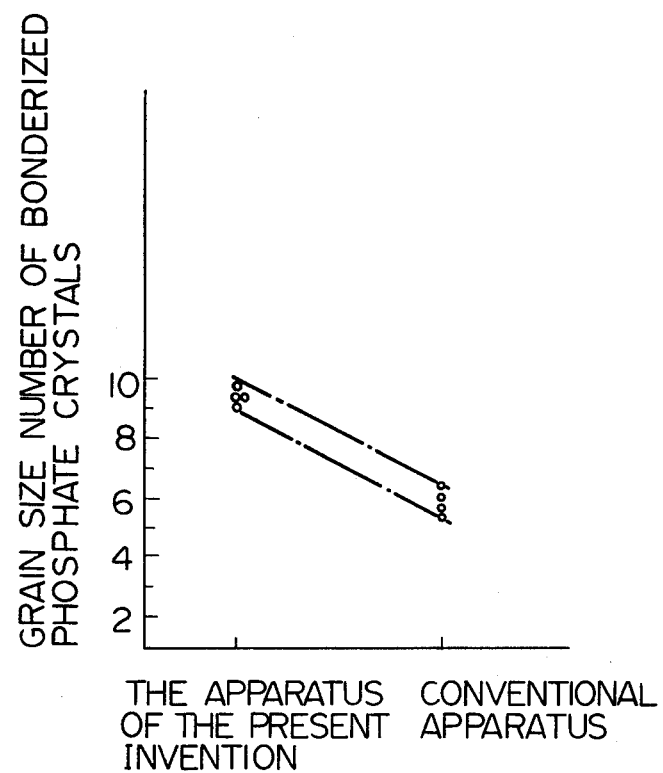
FIG. 3 is a graph showing the grain size of crystals in a phosphate film formed by a bonderizing method on the surface of a steel strip which has been surface treated by using the apparatus of the present invention and by a pickling apparatus alone.

The dried steel strip was subjected to an ordinary bonderizing procedure. The gain size number of the resultant phosphate crystals was in a range of from 9 to 10 as indicated in FIG. 3.

For the purpose of comparison, the same procedures as those of the above-described experiment were carried out, except that the electrolytic treating procedure and the second rinsing procedure were omitted. The grain size number of the resultant phosphate crystals was in a range of about 5 to 6.

From the above-described experiments, it is evident that the apparatus of the present invention is remarkably effective for enhancing the phosphatizing property of the steel strip.

We claim:

1. An apparatus for the surface treatment of a steel strip, particularly a strip from a continuous annealing apparatus, which strip is adversely affected if allowed to become dry prior to the time it leaves the surface treatment apparatus, said surface treatment apparatus comprising:

(1) a plurality of guide rolls for moving the steel strip along a predetermined path;
   (2) a pickling vessel through which a portion of said steel strip path extends, and a first pickling liquid spray means in said pickling vessel for spraying a pickling liquid toward at least one surface of said steel strip as it passes through the pickling vessel, said path extending upwardly out of said pickling vessel and around one of said guide rolls; a further pickling liquid spray means positioned adjacent the top of the path from said pickling vessel at the point where the strip passes around said one of said guide rolls for spraying pickling liquid onto said one surface for keeping the surface wet with pickling liquid;
   (3) a first rinsing vessel through which a portion of said steel strip path extends and which is located downstream with respect to the movement of the strip along said path of said pickling vessel, first rinsing water spray means in said first rinsing vessel for spraying rinsing water toward said at least one surface of the steel strip as it passes through said first rinsing vessel, said path extending upwardly out of said first rinsing vessel and around one of said guide rolls; a further rinsing water spray means positioned adjacent the top of the path from said first rinsing vessel at the point where the strip passes around said guide roll for spraying rinsing water onto said one surface of the steel strip for keeping the surface wet with rinsing water;
   (4) an electrolytic treating vessel for containing an electrolytic treating liquid and through which a portion of said steel strip path extends and which is located downstream of said first rinsing vessel, and at least one anode positioned in said electrolytic treating vessel at a position below the level of the electrolytic treating liquid therein and facing the said one surface of the steel strip, and means operatively associated with said electrolytic treating vessel for controlling the temperature of the electrolytic treating liquid; said path extending upwardly out of said electrolytic treating vessel and around one of said guide rolls; an electrolytic treating liquid spray means positioned adjacent the top of said path from said electrolytic treating vessel at the point where the strip passes around said guide roll for spraying electrolytic treating liquid on said one surface of said strip for keeping said surface wet with electrolytic treating liquid;
   (5) a second rinsing vessel through which a portion of said steel strip path extends and which is located downstream of said electrolytic treating vessel, second rinsing water spray means in said second rinsing vessel for spraying rinsing water toward said at least one surface of the steel strip as it passes through said second rinsing vessel, said path extending upwardly out of said second rinsing vessel; and
   (6) said guide roll at the top of the path from said electrolytic treating vessel being of a conductive material, and voltage applying means for applying an electrolyzing voltage between said anode and said conductive material guide roll.

2. The apparatus as claimed in claim 1, further comprising means for removing excess pickling liquid retained on said steel strip surface and located just downstream of said further pickling liquid spraying means.

3. The apparatus as claimed in claim 1, further comprising means for removing excess rinsing water retained on said rinsed surface of said steel strip and located just downstream of said further rinsing water spray means at the top of said path from said first rinsing vessel.

4. The apparatus as claimed in claim 1, further comprising means for removing excess electrolytic treating liquid retained on said electrolytically treated surface of said steel strip and located just downstream of said electrolytic treating liquid spraying means.

* * * * *